(12) United States Patent
Akman

(10) Patent No.: US 7,146,410 B1
(45) Date of Patent: Dec. 5, 2006

(54) SYSTEM AND METHOD FOR EXECUTING CONTROL PROTOCOLS AMONG NODES IN SEPARATE IP NETWORKS

(75) Inventor: Arda Akman, Apex, NC (US)

(73) Assignee: Nortel Networks Limited, St. Laurent (CA)

( * ) Notice: Subject to any disclaimer, the term of this patent is extended or adjusted under 35 U.S.C. 154(b) by 537 days.

(21) Appl. No.: 09/589,449

(22) Filed: Jun. 7, 2000

(51) Int. Cl.
*G60F 15/177* (2006.01)

(52) U.S. Cl. ............... 709/220; 709/227; 709/230; 370/249; 370/389; 370/352

(58) Field of Classification Search ........ 709/220–225, 709/245, 249, 203, 204, 227, 230; 370/389, 370/352, 395.1, 385.2, 401, 359
See application file for complete search history.

(56) References Cited

U.S. PATENT DOCUMENTS

| | | | | |
|---|---|---|---|---|
| 6,154,839 A * | 11/2000 | Arrow et al. | ............... | 713/154 |
| 6,360,265 B1 * | 3/2002 | Falck et al. | ............... | 709/227 |
| 6,381,646 B1 * | 4/2002 | Zhang et al. | ............... | 709/227 |
| 6,404,746 B1 * | 6/2002 | Cave et al. | ............... | 370/262 |
| 6,411,967 B1 * | 6/2002 | Van Renesse | ............... | 707/201 |
| 6,434,627 B1 * | 8/2002 | Millet et al. | ............... | 709/245 |
| 6,496,851 B1 * | 12/2002 | Morris et al. | ............... | 709/204 |
| 6,711,138 B1 * | 3/2004 | Pai et al. | ............... | 370/257 |
| 6,741,585 B1 * | 5/2004 | Munoz et al. | ............... | 370/352 |
| 6,801,521 B1 * | 10/2004 | Shaffer et al. | ............... | 370/352 |

* cited by examiner

*Primary Examiner*—Jeffrey Pwu
(74) *Attorney, Agent, or Firm*—Withrow & Terranova, PLLC

(57) ABSTRACT

Systems and methods for ensuring that control protocols can be used between Media Gateways 130, 140 and Media Gateway Controllers 110 that reside on separate IP networks 120, 150. Network Address Translation (NAT) is strategically implemented to inspect and translate control protocol messages exchanged between nodes on separate IP networks. One method is to add NAT intelligence to a firewall/router 160 giving it the ability to inspect and translate the IP addresses within control protocol messages. Another method is to have a firewall/router 160 forward control protocol messages to a separate NAT server 170 to inspect and translate the IP addresses within control protocol messages. The former implementation places a significant amount of real-time work on the firewall/router which can affect its performance in its core duties. The latter implementation does not affect performance but requires deploying additional hardware.

20 Claims, 6 Drawing Sheets

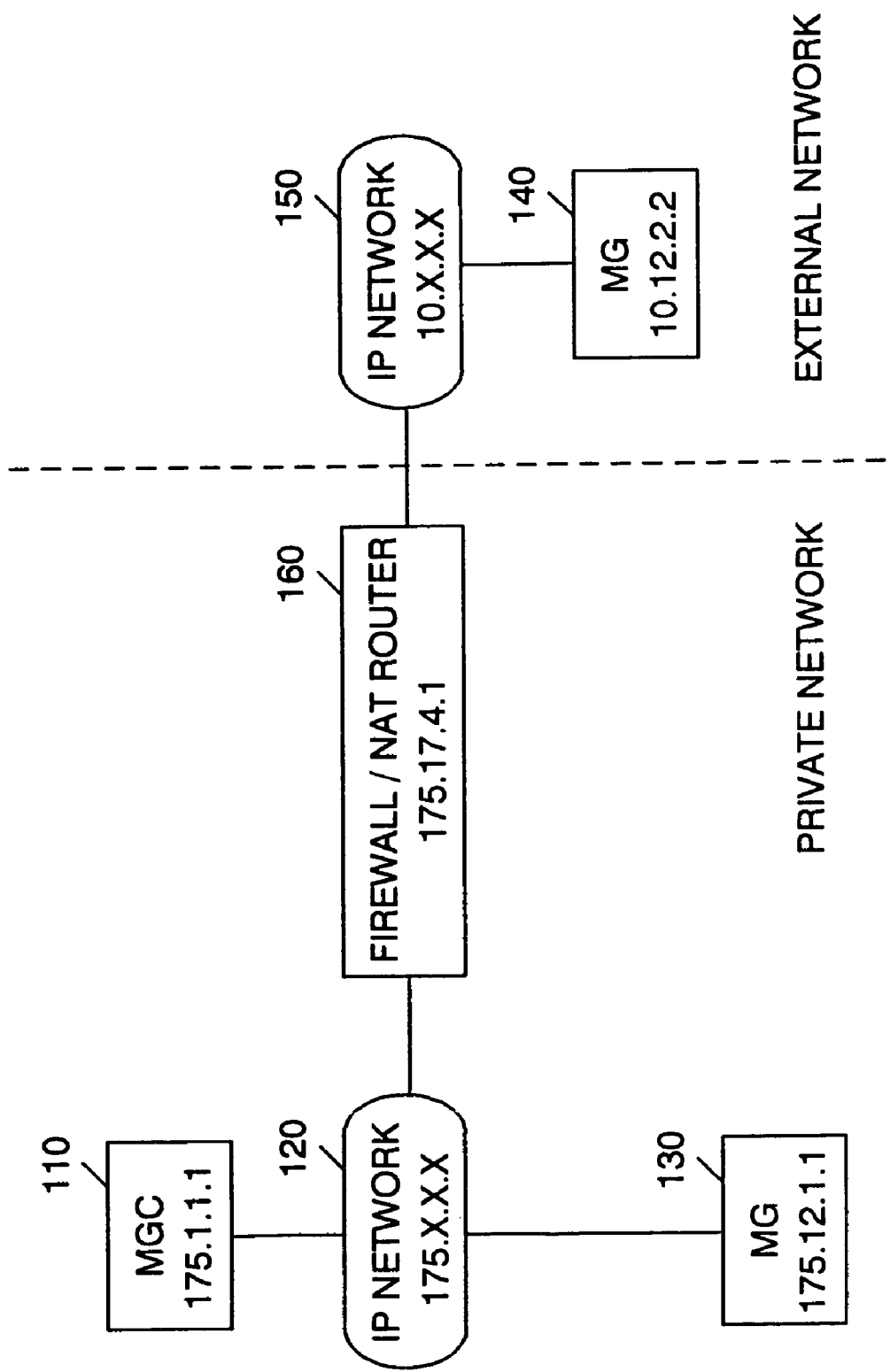

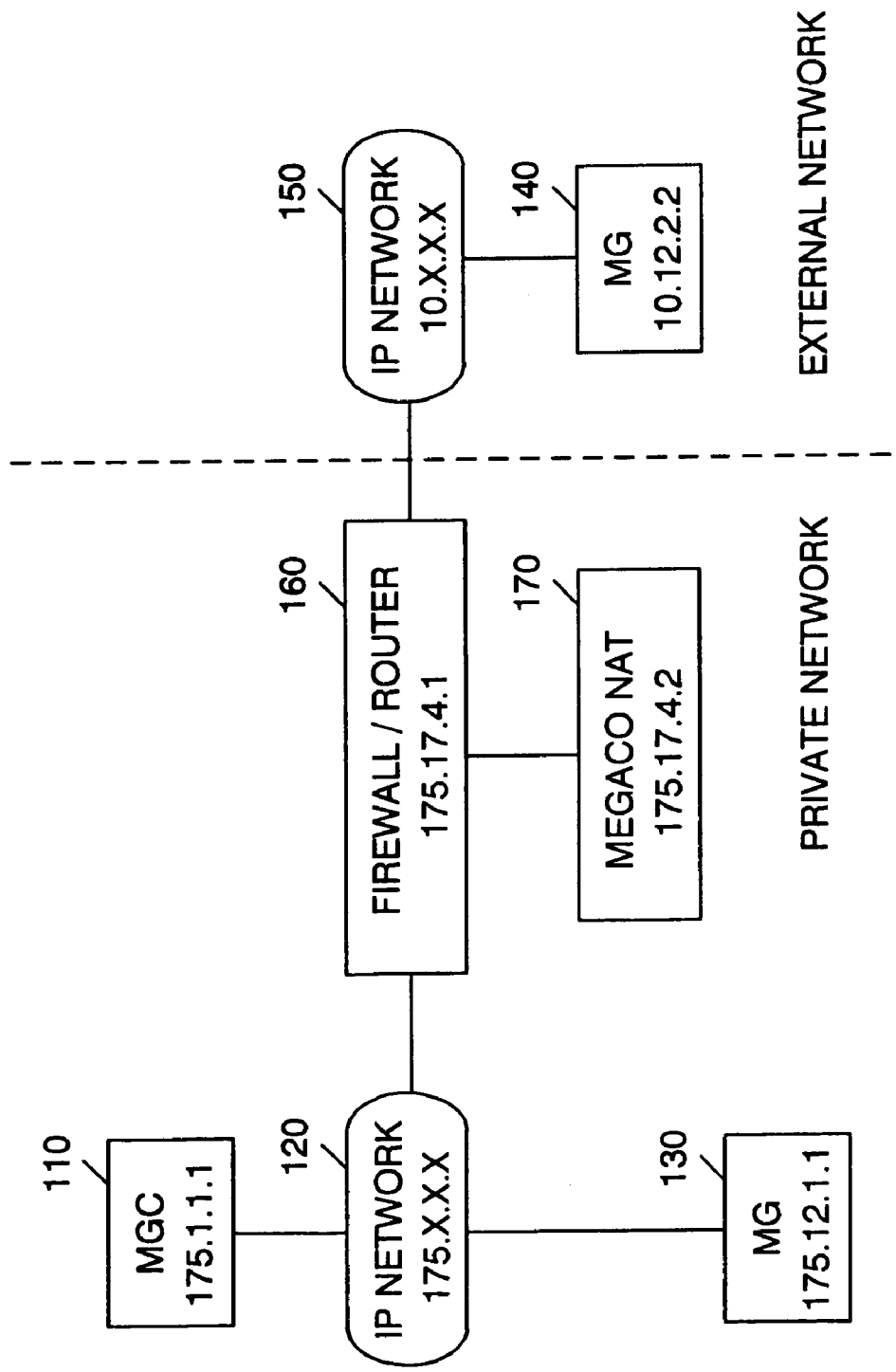

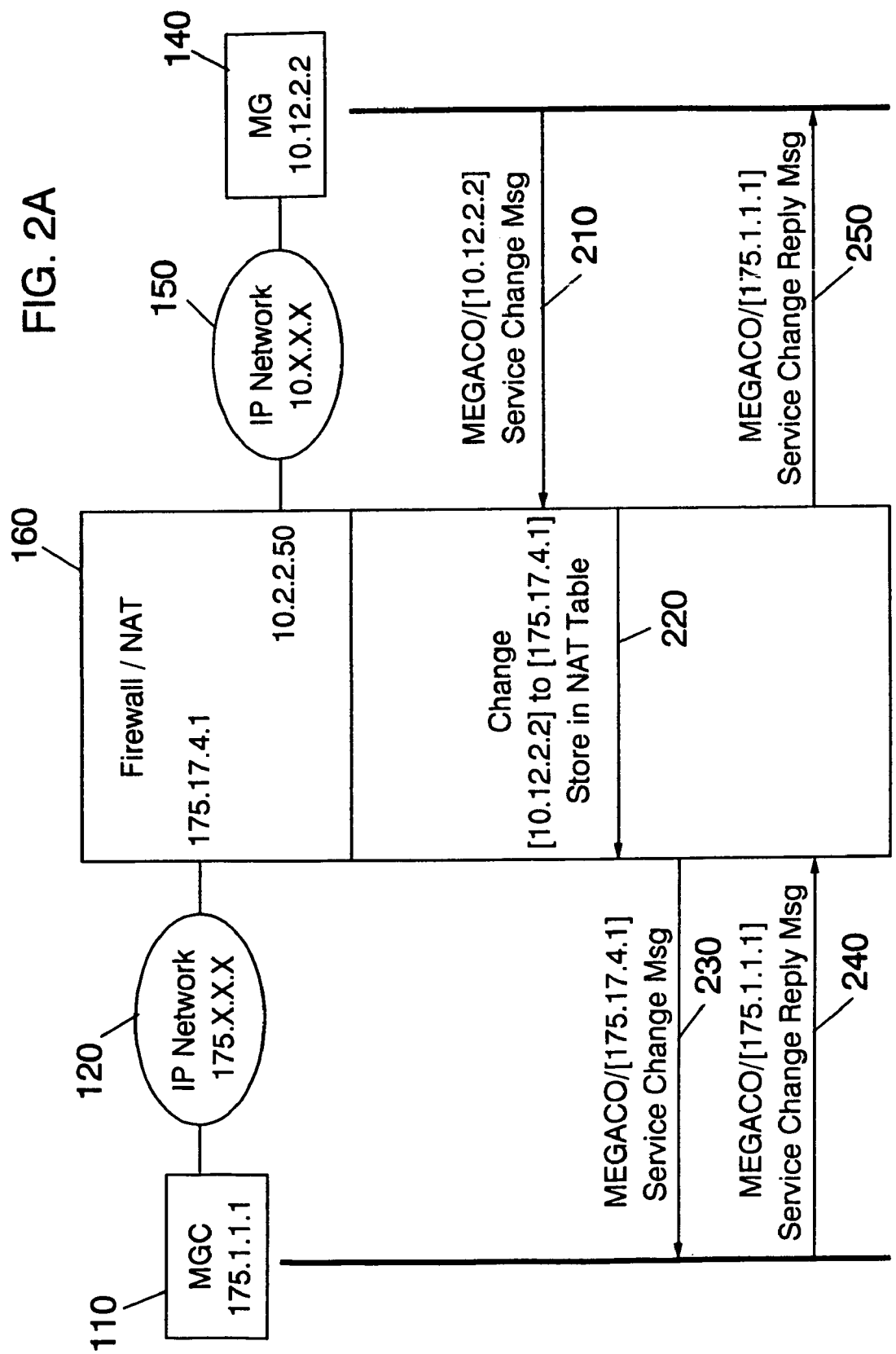

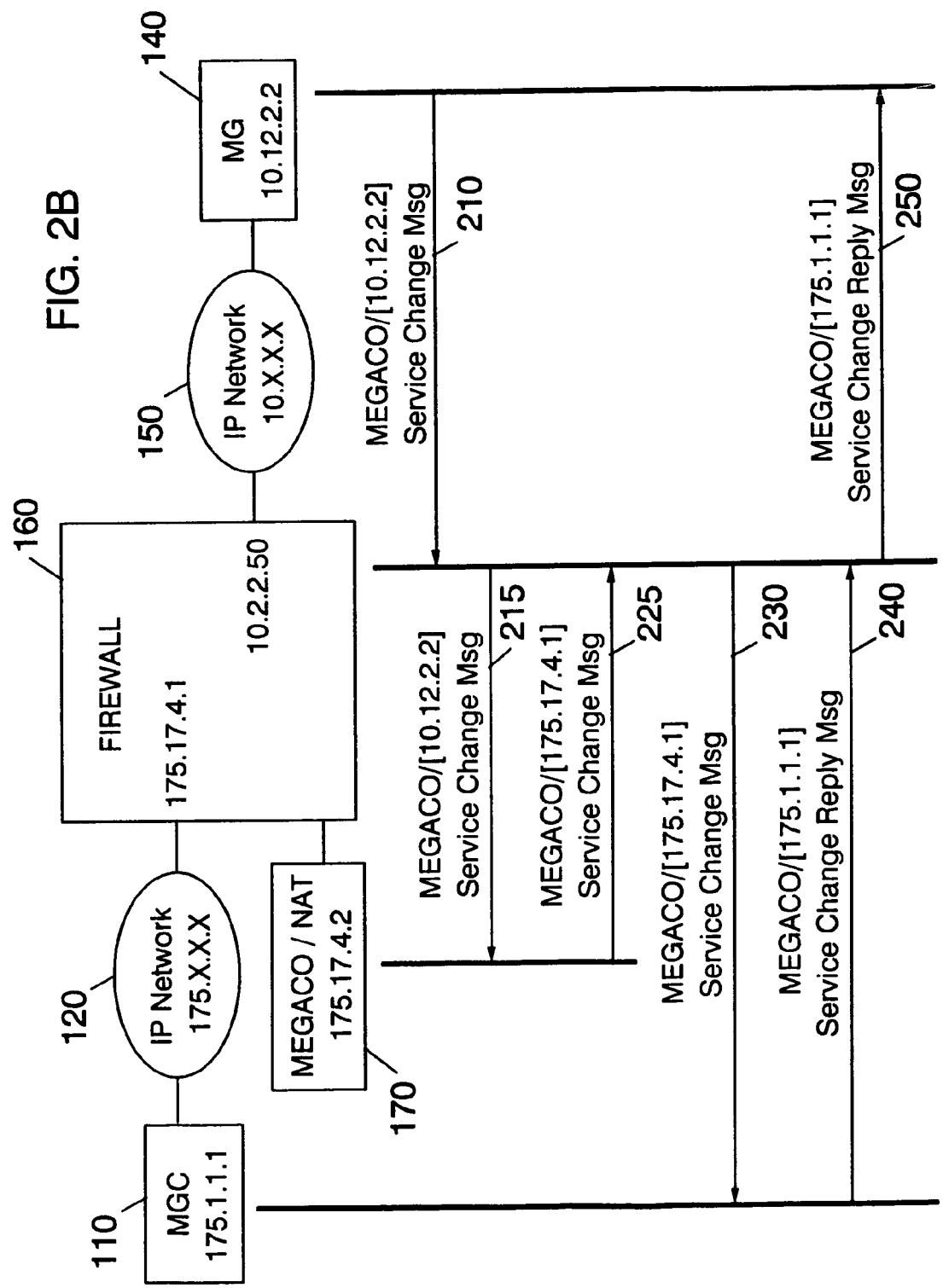

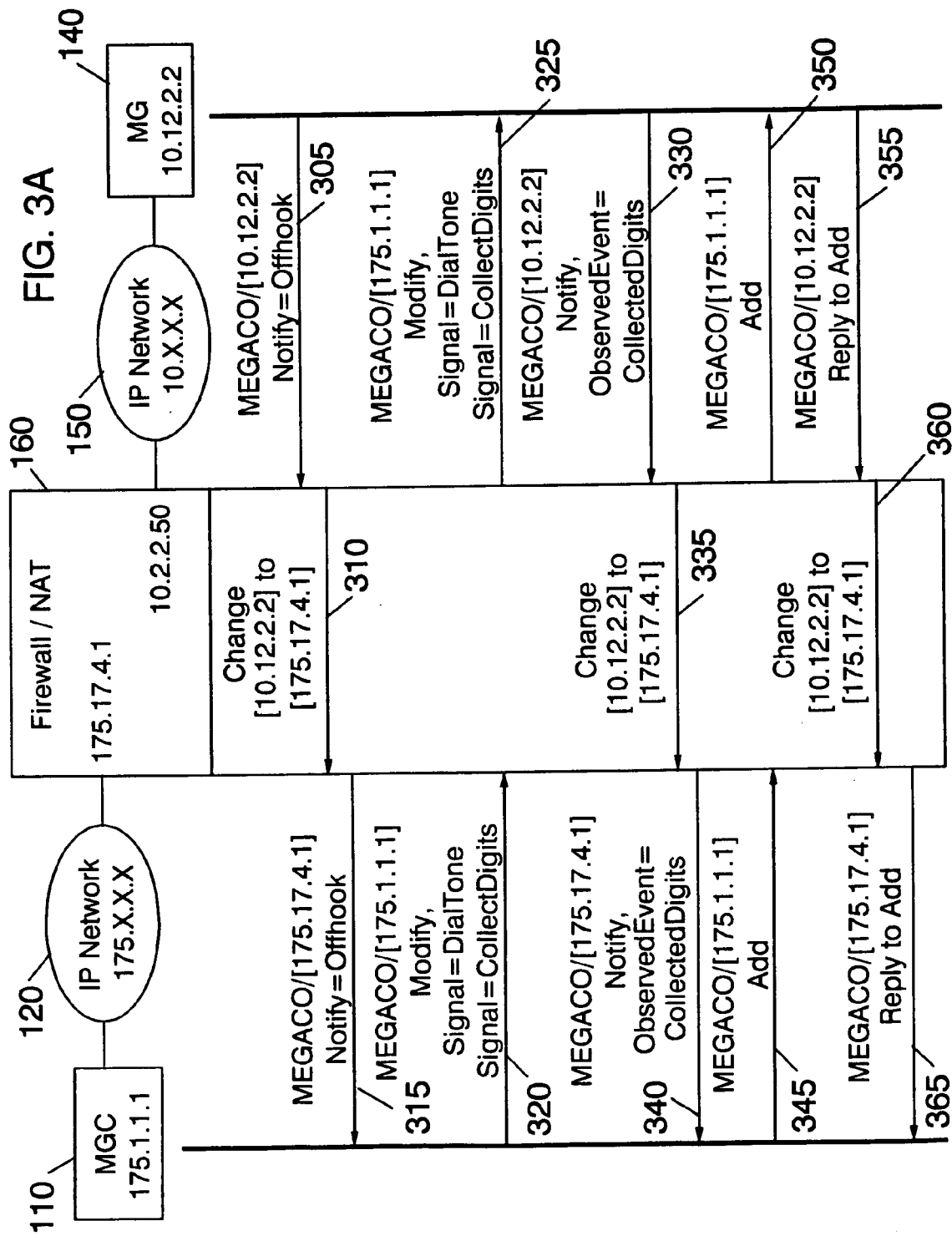

SYSTEM AND METHOD FOR EXECUTING CONTROL PROTOCOLS AMONG NODES IN SEPARATE IP NETWORKS

FIELD OF THE INVENTION

The present invention relates generally to a means for running a control protocol within two IP networks that are separated by a firewall/router utilizing Network Address Translation (NAT).

BACKGROUND OF THE INVENTION

MEGACO is a recently adopted standard (control protocol) for controlling Media Gateways (MGs) via Media Gateway Controllers (MGCs). MEGACO makes use of IP addresses explicitly contained within control messages exchanged between MGs and MGCs. Network Address Translation (NAT) is the act of changing an IP address from one IP network realm to another IP network realm where the IP networks are separated by a firewall/router. NAT is employed for such reasons as security, ease of network configuration, and a lack of IP addresses. Thus, in a configuration of two different IP networks separated by a firewall/router, NAT is used to ensure that IP packets reach their intended destinations. MEGACO currently will not function properly across different IP networks, however, because the IP addresses embedded in MEGACO messages are not subjected to NAT.

What is needed is a mechanism for allowing the firewall/router separating the IP networks to inspect and translate the IP addresses within MEGACO message packets during the NAT procedure. Such a mechanism would allow an MGC in one IP network to control an MG in another IP network.

SUMMARY OF THE INVENTION

The present invention comprises systems and methods for ensuring that the control protocols (e.g., MEGACO) can be used between Media Gateways (MGs) and Media Gateway Controllers (MGCs) that reside on separate IP networks. Network Address Translation (NAT) is strategically implemented to inspect and translate control protocol messages exchanged between nodes on separate IP networks.

Two methodologies for inspecting and translating control protocol messages are presented herein. One is to add NAT intelligence to a firewall/router giving the firewall/router the ability to inspect and translate IP addresses within control protocol messages. Another is to have a firewall/router forward control protocol messages to a separate NAT server to inspect and translate the IP addresses within control protocol messages. The former implementation places a significant amount of real-time work on the firewall/router which can affect its performance of its core duties. The latter implementation does not affect performance but requires deploying additional hardware. Thus, the former implementation is advantageous when firewall/router performance is not critical since it is more cost effective while the latter implementation is advantageous when performance is critical. Regardless of the implementation chosen the methodology is essentially the same, namely, using Network Address Translation (NAT) to translate IP addresses embedded within control protocol messages.

In accordance with a first embodiment of the invention is a device for translating IP addresses of control protocol messages sent between nodes on separate IP networks. The device receives a control protocol message from a node on a first IP network and translates IP addresses within the control protocol message from the IP address domain of the first IP network to an IP address domain of another IP network. The device then routes the control protocol message to a node on the second IP network.

There is, in accordance with a second embodiment of the invention, a firewall/NAT router for translating IP addresses of control protocol messages sent between MG and MGC nodes on separate IP networks. The firewall/NAT router includes a port having an IP address on a first IP network for receiving a control protocol message from a media gateway having an IP address on the first IP network. The Network Address Translation (NAT) component of the device is for translating the IP address of the media gateway included in the control protocol message. The routing component of the device then routes the control protocol message to a media gateway controller having an IP address on the second IP network.

Other aspects and features of the present invention will become apparent to those ordinarily skilled in the art upon review of the following description of specific embodiments of the invention in conjunction with the accompanying figures.

BRIEF DESCRIPTION OF THE FIGURES

FIG. 1A illustrates a network architecture in which a Media Gateway Controller (MGC) in one IP network controls a Media Gateway (MG) in another IP network using an enhanced firewall/NAT router implementation.

FIG. 1B illustrates a network architecture in which a Media Gateway Controller (MGC) in one IP network controls a Media Gateway (MG) in another IP network using an additional server implementation operatively connected to a firewall/NAT router.

FIG. 2A illustrates MEGACO messaging used for Media Gateway discovery using the implementation in which an enhanced firewall/NAT router translates IP addresses.

FIG. 2B illustrates MEGACO messaging used for Media Gateway discovery using the implementation in which an additional server operatively connected to a firewall/NAT router translates IP addresses.

FIG. 3A is a basic IP telephony call walk through of messages exchanged between a Media Gateway and a Media Gateway Controller using a firewall as a MEGACO NAT device to translate IP addresses within control protocol messages.

DETAILED DISCLOSURE OF THE INVENTION

Figure 3B:
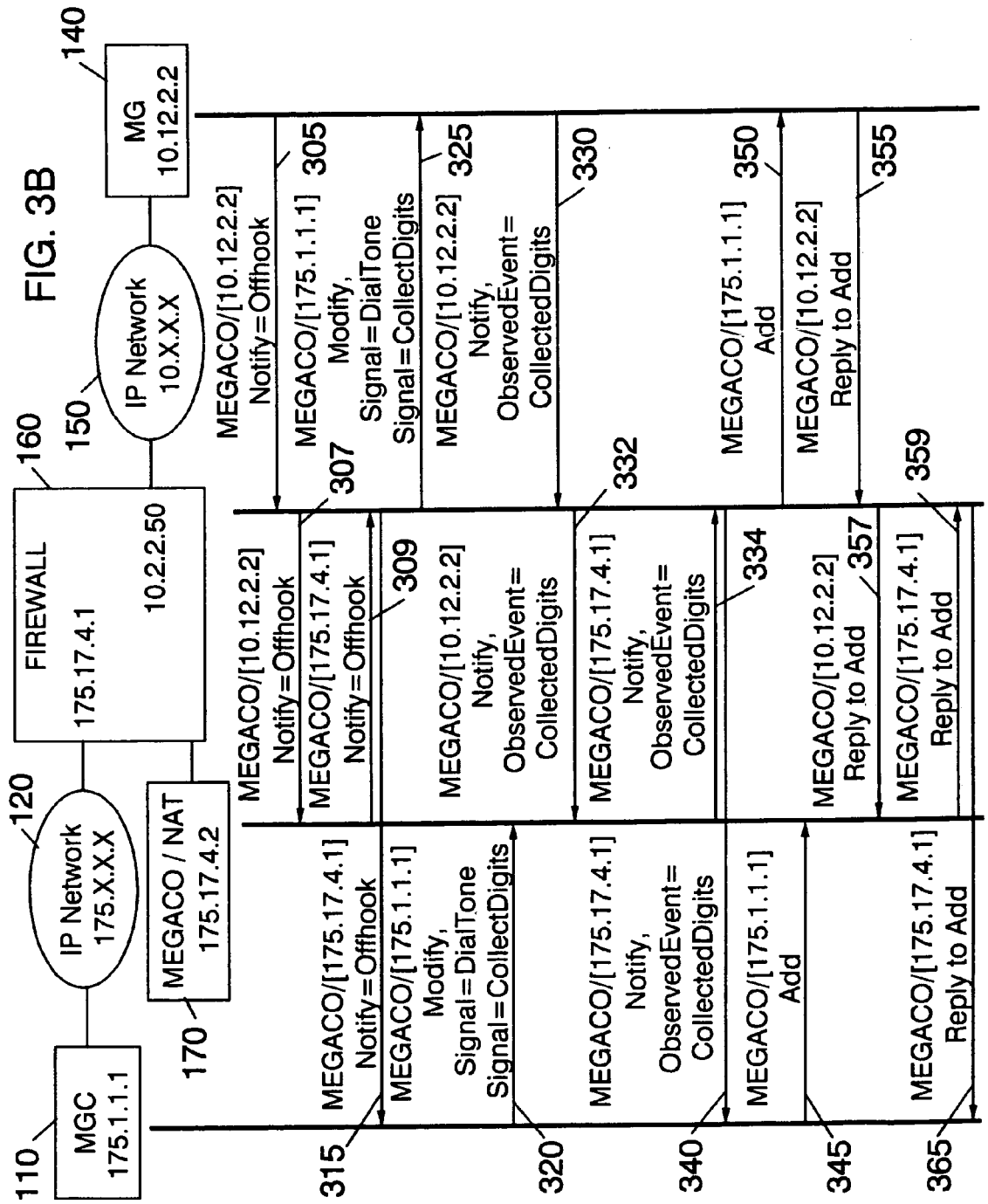
FIG. 3B is a IP telephony basic call walk through of messages exchanged between a Media Gateway and a Media Gateway Controller using a separate MEGACO NAT server in conjunction with a firewall to translate IP addresses within control protocol messages.

Network Address Translation (NAT) allows hosts in a private computer network to transparently communicate with destinations on an external computer network and vice versa. NAT devices provide a transparent routing solution to end nodes that are resident on separate networks having different address schemes. This is achieved by modifying end node addresses while data is en-route between network realms and maintaining state information for these modifications so that datagrams pertaining to a communication session are routed to the proper end node in both network realms. Modification will typically occur at a firewall that separates the private network from the external network. The firewall is typically part of and under the control of the private network. The firewall commonly takes on routing functions as well.

NAT is commonly used for a variety of reasons. Probably the most important of which is a lack of IP addresses. NAT is extremely powerful in that the private network may have only one (1) valid external (Internet) address, it can maintain up to 16 million internal IP addresses on the private network. This gives 16 million end nodes in the private network the ability to communicate with external network nodes. Moreover, if the other end node represents another private network with NAT capability, even more end nodes can be reached. Another compelling reason for NAT is the security it provides. By implementing NAT, private network configuration is kept secret to the outside world. Yet another reason to use NAT is its ease of configuration. Even if there is an external network change, private network configuration maintains the same internal IP address configuration.

MEGACO is a control protocol that is used by a Media Gateway Controller (MGC) to control at least one Media Gateway (MG). MGs include resources (terminations) that can be identified by IP addresses. When an MGC communicates with an MG using MEGACO, the MEGACO messages carry IP addresses corresponding to specific resources within the MG. One possible configuration is that of a Media Gateway Controller (MGC) in a different network than a Media Gateway (MG) that it controls where they are connected by IP Network Address Translation (NAT). In such a configuration MEGACO messaging will fail because the IP addresses within the MEGACO messages will not be translated by the NAT device. The solution is to enhance the firewall/NAT router by giving it the ability to inspect and translate IP addresses within MEGACO messages or to have the firewall/NAT router offload the MEGACO messages to a special MEGACO NAT server for IP address translation.

The present invention is described with reference to MEGACO as the control protocol. It is to be understood that the present invention will function for any control protocol having embedded IP addresses in the messaging. Thus, the description of MEGACO is illustrative and not intended to limit the scope of the present invention.

FIG. 1A illustrates a network architecture in which a Media Gateway Controller (MGC) in one IP network controls a Media Gateway (MG) in another IP network. FIG. 1A uses an enhanced firewall/NAT router implementation to translate the IP addresses within MEGACO messages. A Media Gateway Controller (MGC) 110 is operatively connected to a first IP network 120. For example purposes the first IP network is shown with an address domain of 175.X.X.X. MGC 110 is shown with a specific IP address of 175.1.1.1. A Media Gateway (MG) 130 (IP address 175.12.1.1) is also operatively connected to IP network 120. MEGACO messages exchanged between MGC 110 and MG 130 require no IP address translation since they are both nodes on the same IP network 120. MEGACO messages exchanged between MGC 110 and a Media Gateway (MG) 140 (IP address 10.12.2.2) operatively connected to a second IP network 150 (IP address domain 10.X.X.X) via a firewall/NAT router 160 (IP address 175.17.4.1) require IP address translation since Media Gateways 130 and 140 are connected to different IP networks 120 and 150, respectively. IP address translation within MEGACO messages is handled by firewall/NAT router 160. This is accomplished by enhancing the functionality of firewall/NAT router 160 with software that inspects and translates the IP addresses within MEGACO messages entering and leaving IP network 120.

FIG. 1B also illustrates a network architecture in which an MGC in one IP network controls an MG in another IP network. FIG. 1B uses an additional server implementation operatively connected to a firewall/NAT router 160 to translate the IP addresses within MEGACO messages. The architecture is virtually the same as that in FIG. 1A with one notable exception. In FIG. 1B an additional server 170 has been operatively connected to firewall/NAT router 160. In this implementation firewall/NAT router 160 is not enhanced. Rather, firewall/NAT router 160 offloads all MEGACO messages entering and leaving IP network 120 to MEGACO NAT server 170 for inspection and translation of IP addresses within MEGACO messages.

FIG. 2A illustrates MEGACO messaging used for MG discovery using the implementation in which an enhanced firewall/NAT router translates the IP addresses within the MEGACO messages.

In the MEGACO protocol, when an MG becomes available, it registers itself with its MGC using a Service Change message. The NAT device (the firewall in this case) listens on a MEGACO port and determines that an MG is becoming available when it receives the Service Change message. The NAT device then can place the IP address of the MG into its own NAT table of IP addresses.

The corresponding messaging among the MGC 110, firewall 160, and MG 140 is as follows. MG [10.12.2.2] 140 sends a MEGACO Service Change message 210 to its MGC 110. The message is received by firewall/NAT 160 which is listening on a MEGACO port having an IP address of [10.2.2.50]. The firewall/NAT 160 then inspects the Service Change message and changes the IP address of the MG from {10.12.2.2} to [175.17.4.1] 220. [175.17.4.1] is the IP address of the firewall/NAT 160 according to the private IP network 120. The change is entered in the NAT table maintained by the firewall/NAT 160. Next, the firewall/NAT 160 sends the MEGACO Service Change message 230 to the MGC 110 using the substitute IP address. The MGC 110 responds with a Service Change Reply message 240 containing its IP address. The firewall/NAT 160 relays the Service Change Reply message 250 to MG [10.12.2.2] 140 completing the registration.

FIG. 2B illustrates the same MEGACO used for MG discovery messaging as in FIG. 2A except that an additional server 170 operatively connected to the firewall/NAT router 160 translates the IP addresses within the MEGACO messages. This time when the firewall 160 receives a MEGACO Service Change message 210 it is automatically off-loaded to a MEGACO/NAT server 170. The MEGACO/NAT server 170 then inspects and translates any IP addresses contained in the message and sends the message back to the firewall 160 with translated IP addresses as represented by message pair 215, 225. The firewall 160 then routes the messages accordingly.

If the message is a Service Change message (as in this case) then the MEGACO NAT server 170 will query the translation rules of the firewall (messaging not shown). Upon receipt of a response regarding the translation rules, the MEGACO NAT server 170 stores the IP translation rules in its own NAT table(s). No more queries are needed after the initial query.

FIG. 3A is a basic IP telephony call walk through of messages exchanged between an MG and an MGC using the firewall as a MEGACO NAT device as discussed in FIG. 1A. This walk through assumes that the MG (10.12.2.2.2) 140 has already registered with the MGC (175.1.1.1) 110 via a Service Change message as previously described in FIGS. 2A and 2B. Moreover, not every message used in a call (e.g., Acknowledgment messages) is shown in this walkthrough. The illustration describes the processes of the present invention such that one of ordinary skill in the art will readily adapt the concept to all the messages used in making an IP telephony call.

MG (10.12.2.2) 140 sends a MEGACO Offhook message 305 containing its own IP address over the IP network 150 having a (10.X.X.X) IP address domain to the firewall/NAT 160. The firewall/NAT 160 resides within the (175.X.X.X) IP network 120 but has a (10.X.X.X) IP address that allows it to communicate with nodes in IP network 150. In this example it has a MEGACO port with an IP address of (10.2.2.50) which receives the MEGACO Offhook message sent by MG (10.12.2.2) 140. The message is intended for MGC (175.1.1.1) 110. However, MGC (175.1.1.1) 110 will not be able to recognize the source IP address of (10.12.2.2) since it is in another domain. Thus, the firewall/NAT 160 inspects the MEGACO Offhook message and translates 310 the IP address (10.12.2.2) into an IP address of (175.17.4.1). IP address (175.17.4.1) is the address of the firewall 160. The NAT functionality in the firewall creates and maintains a NAT table that links addresses in the 10.X.X.X domain and the (175.X.X.X) domain. Once the translation has taken place, the firewall/NAT 160 routes 315 the MEGACO Offhook message with the translated IP address to the MGC 110. The MGC 110 responds with a MEGACO Modify message 320 having signal components of DialTone and CollectDigits. The MEGACO Modify message is sent 325 back to the MG 140 via the firewall/NAT 160. No translation is needed for messages leaving the (175.X.X.X) domain because MG 140 recognizes that MGC 110 is at IP address (175.1.1.1) and sends packets to that address. It is the MGC 110 that does not recognize the (10.12.2.2) IP address of MG 140 that necessitates NAT functionality.

When the MG 140 receives the MEGACO Modify message having signal components of DialTone and CollectDigits it responds back to the MGC 110 with a MEGACO Notify message 330 having a component of ObservedEvent=CollectedDigits. Again, the message is received into the firewall/NAT 160 and a NAT IP address substitution takes place 335 ensuring that the message reaches 340 the MGC 110 with an IP address that it can understand. The MGC 110 responds with MEGACO Add message 345 which is passed through the firewall 350 to the MG. The MG 140 responds with a MEGACO Reply to Add message 355 which undergoes IP address translation 360 in the firewall/NAT 160 prior to reaching 365 MGC 110.

FIG. 3B is the same IP telephony call walk through of messages exchanged between an MG and an MGC using a separate MEGACO NAT server 170 connected to the firewall 160. This time when the firewall receives a MEGACO message it is automatically off-loaded to a MEGACO/NAT server. The MEGACO/NAT server then inspects and translates any IP addresses contained in the message and sends the message back to the firewall with translated IP addresses. The firewall then routes the messages accordingly. The offloading and translating of MEGACO messages is illustrated by message pairs 307 and 309, 332 and 334, and 357 and 359.

It is to be understood that the present invention illustrated herein is readily implementable by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, optical storage media, or tape. The media can also be a memory storage device or collection of memory storage devices such as read-only memory (ROM) or random access memory (RAM). Additionally, the computer program code can be transferred to the appropriate hardware over some type of data network.

The present invention has been described, in part, with reference to flowchart illustration(s) or message diagram(s). It will be understood that each block of the flowchart illustrations or message diagram, and combinations of blocks in the flowchart illustrations or message diagrams, can be implemented by computer program instructions.

These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block(s) or message diagram(s).

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block(s). The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block(s) or message diagram(s).

Accordingly, block(s) of flowchart illustrations or message diagram(s) support combinations of means for performing the specified functions, combinations of steps for performing the specified functions and program instruction means for performing the specified functions. It will also be understood that each block of flowchart illustrations or message diagram, and combinations of blocks in flowchart illustrations, or message diagrams can be implemented by special purpose hardware-based computer systems that perform the specified functions or steps, or combinations of special purpose hardware and computer instructions.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. An apparatus for translating IP addresses within control protocol messages, said control protocol messages originating and terminating in different IP networks, said apparatus comprising:

means for receiving a control protocol message from a node on a first IP network;

means for translating an IP address within said control protocol message from the IP address associated with the first IP network to a second IP address associated with a second IP network, said means for translating the IP address within said control protocol message being positioned in a device within said first IP network; and means for routing the control protocol message to a second node on said second IP network.

2. The apparatus of claim 1 wherein said translation is Network Address Translation (NAT).

3. The apparatus of claim 1 wherein the node on said first IP network is a media gateway and the node on said second IP network is a media gateway controller.

4. The apparatus of claim 1 wherein said control protocol is MEGACO.

5. The apparatus of claim 1 wherein said device within said first IP network is selected from the group consisting of: a firewall for the first IP network, a router for the first IP network, and a server positioned within the first IP network behind a firewall.

6. A firewall apparatus for translating an IP address within control protocol messages exchanged between a media gateway on a first IP network and a media gateway controller on a second IP network, said firewall apparatus comprising:

a port having an IP address associated with said first IP network, said port for receiving a control protocol message from the media gateway intended for the media gateway controller, said control protocol message including an IP address associated with said first IP network;

a Network Address Translator for translating the IP address associated with said first IP network included within said control protocol message to an IP address associated with said second IP network; and a routing component for routing the control protocol message to the media gateway controller.

7. The firewall apparatus of claim 6 wherein the control protocol is MEGACO.

8. The firewall apparatus of claim 6 wherein said port is adapted to listen for a Service Change message indicative of a previously presented media gateway becoming available.

9. The firewall apparatus of claim 8 wherein said Network Address Translator is adapted to place an IP address of the previously presented media gateway in a NAT table of IP addresses.

10. A method of translating IP address within control protocol messages exchanged between a node on a first IP network and a node on a second IP network, said method comprising:

receiving a control protocol message from the node on said second IP network, said control protocol message including an IP address associated with said second IP network;

translating the IP address associated with said second IP network included within said control protocol message to an IP address associated with said first IP network, wherein said translating occurs at a device within said first IP network;

routing the control protocol message to the node on said first IP network; and wherein the control protocol is MEGACO.

11. The method of claim 10 wherein said translating occurs at a device within said first IP network comprises translating in a device selected from the group consisting of: a firewall for the first IP network, a router for the first IP network, and a server positioned behind a firewall for the first IP network.

12. A computer program product for translating IP addresses within control protocol messages exchanged between a node on a first IP network and anode on a second IP network, the computer program product having a storage medium with a computer program embodied thereon, the computer program product comprising:

computer program code for receiving a control protocol message from the node on said second IP network, said control protocol message including an IP address associated with said second IP network;

computer program code for translating the IP address associated with said second IP network included within said control protocol message to an IP address associated with said first IP network, wherein said translating occurs at a device within said first IP network;

computer program code for routing the control protocol message to the node on said first IP network.

13. The computer program product of claim 12 wherein the control protocol is MEGACO.

14. The computer program product of claim 12 wherein said computer program code for translating functions on a device selected from the group consisting of: a firewall for the first IP network, a router for the first IP network, and a server positioned behind a firewall for the first IP network.

15. A system for translating IP addresses within control protocol messages, said control protocol messages originating and terminating in different IP networks, said system comprising:

a firewall for:
  receiving messages from a node on a first IP network;
  offloading control protocol messages to a server; and
  routing messages to a node on a second IP network, and a server positioned within the first IP network behind the firewall for:
  receiving control protocol messages from said firewall;
  translating IP addresses within said control protocol messages from IP addresses associated with the first IP network to JP addresses associated with the second IP network; and
  returning the translated control protocol messages to said firewall.

16. The system of claim 15 wherein the control protocol is MEGACO.

17. A method of translating IP addresses within control protocol messages exchanged between a node on a first IP network and a node on a second IP network comprising:

having a firewall on the first IP network receive a control protocol message from the node on the second IP network;

having the firewall offload the received control protocol message to a server positioned within the first IP network and behind the firewall;

having said server translate IP addresses within said control protocol message from an IP address associated with the second IP network to an IP address associated with the first IP network; and having said server route the translated control protocol message to a node on said first IP network.

18. The method of claim 17 wherein the control protocol is MEGACO.

19. A computer program product for translating IP addresses within control protocol messages, exchanged between a node on a first IP network and a node on a second IP network, the computer program product having a storage medium with a computer program embodied thereon, the computer program product comprising:

computer program code for having a firewall on the first IP network receive a control protocol message from the node on the second IP network;

computer program code for having the firewall offload the received control protocol message to a server positioned within the first IP network and behind the firewall;

computer program code for having said server translate IP addresses within said control protocol message from an IP address associated with the second IP network to an IP address associated with the first IP network; and computer program code for having said server route the translated control protocol message to the node on said first IP network.

20. The computer program product of claim 19 wherein the control protocol is MEGACO.

* * * * *